United States Patent
Kubota et al.

(10) Patent No.: US 9,210,718 B2
(45) Date of Patent: Dec. 8, 2015

(54) METHOD AND APPARATUS FOR IMPROVING TRANSMISSION RESOURCE UTILIZATION

(71) Applicant: Broadcom Corporation, Irvine, CA (US)

(72) Inventors: Keiichi Kubota, Weybridge (GB); Michael Whitehead, Farnham (GB)

(73) Assignee: BROADCOM CORPORATION, Irvine, CA (US)

(*) Notice: Subject to any disclaimer, the term of this patent is extended or adjusted under 35 U.S.C. 154(b) by 122 days.

(21) Appl. No.: 14/066,154

(22) Filed: Oct. 29, 2013

(65) Prior Publication Data

US 2014/0126495 A1     May 8, 2014

(30) Foreign Application Priority Data

Nov. 2, 2012 (GB) .................................. 1219718.2

(51) Int. Cl.
*H04W 4/00* (2009.01)
*H04W 72/14* (2009.01)
*H04L 12/877* (2013.01)
*H04W 28/06* (2009.01)
*H04L 12/801* (2013.01)

(52) U.S. Cl.
CPC ............. *H04W 72/14* (2013.01); *H04L 47/525* (2013.01); *H04W 28/06* (2013.01); *H04L 47/14* (2013.01)

(58) Field of Classification Search
None
See application file for complete search history.

(56) References Cited

U.S. PATENT DOCUMENTS

| 2007/0047553 | A1  | 3/2007  | Matusz et al. |
| 2009/0248714 | A1* | 10/2009 | Liu ................................ 707/100 |
| 2009/0258666 | A1* | 10/2009 | Pelletier et al. ............... 455/522 |
| 2010/0034113 | A1* | 2/2010  | Marinier et al. .............. 370/252 |
| 2010/0255850 | A1* | 10/2010 | Kaukoranta et al. .......... 455/450 |

(Continued)

FOREIGN PATENT DOCUMENTS

| WO | 2006/118427 A2 | 11/2006 |
| WO | 2006/118831 A2 | 11/2006 |

(Continued)

OTHER PUBLICATIONS

3GPP TS 25.321 v10.7.0 (Sep. 2012); Technical Specification Group Radio Access Network; Medium Access Control (MAC) Protocol Specification (Release 10) (198 pages).

*Primary Examiner* — Chi H Pham
*Assistant Examiner* — Song-Dong D Hyun
(74) *Attorney, Agent, or Firm* — Oblon, McClelland, Maier & Neustadt, L.L.P.

(57) ABSTRACT

A method, apparatus and non-transitory computer-readable storage medium are provided in order to manage transmission of data. In this regard, the method comprises populating a first portion of a transmission data allocation with data of a first data type associated with a first one of a plurality of transmission grants, the plurality of transmission grants defining an allowed amount of transmission data for a plurality of data types, each transmission grant associated with one or more of the data types, populating a second portion of the transmission data allocation with data of a second data type associated with a second one of the plurality of transmission grants, determining, using a processor, that additional space remains in the first portion of the transmission data allocation, and populating the transmission data allocation with data of the second data type equal to a size of the additional space.

20 Claims, 4 Drawing Sheets

(56) References Cited

U.S. PATENT DOCUMENTS

2011/0211447 A1* 9/2011 Wang et al. .................. 370/230
2013/0336231 A1* 12/2013 Ankel ........................... 370/329

FOREIGN PATENT DOCUMENTS

WO 2008/005503 A2 1/2008
WO 2010/051520 5/2010

* cited by examiner

METHOD AND APPARATUS FOR IMPROVING TRANSMISSION RESOURCE UTILIZATION

CROSS REFERENCE TO RELATED APPLICATION

This application claims the benefit under 35 U.S.C. §119 (a) and 37 CFR §1.55 to UK patent application no. 1219718.2, filed on Nov. 2, 2012, the entire content of which is incorporated herein by reference.

TECHNICAL FIELD

An example embodiment of the present invention relates generally to wireless communications, and, more particularly, to management of network transmissions during wireless communications.

BACKGROUND

It is increasingly common for smart phones, laptops, and other devices to contain communications interfaces that are capable of interacting with wireless data services such as 3G, WiMAX, and Long Term Evolution networks. Proliferation of these devices has also lead to development of novel applications and usage patterns that leverages the "always on" nature of the wireless data networks. As these devices become more powerful and approach the capabilities of personal computers, it has become possible for data transmission techniques that were designed and refined for communication among networked computers to be applied to the increased ranges of the wireless communication realm.

Some of these data transmission protocols allow for negotiation of data transmission between a user equipment (e.g., a mobile phone) and a network node (e.g. a cellular tower or other network terminal in communication with the user equipment). Negotiated parameters may specify a data transmission allowance (e.g., time slices or frequency ranges) for certain data. Different transmission windows may be assigned for different types of data. For example, the Third Generation Partnership Project (3GPP) standard 25.321 specifies a networking protocol for communication on a Medium Access Control (MAC) layer that includes a first specified data transmission allowance for non-scheduled data (e.g., signaling data, voice data, etc.), and a second data transmission allowance for scheduled data (e.g., packet switched data). These data transmission allowances may be combined to determine a total data transmission allowance by aggregating one or more of the individual grants. For example, a non-scheduled grant may be provided when communication is established between the network node and the user equipment (e.g., when a radio bearer is established), and a scheduled grant may be dynamically updated based on the available resources of the network. The scheduled grant and non-scheduled grant may together determine the overall data transmission allowance.

The user equipment may select a size of a transmission data allocation based on the grants received from the network node. For example, the user equipment may select a transmission data allocation corresponding to the largest amount of data that still fits within the grants received from the network node. The user equipment may have a small amount of non-scheduled data to transmit, such that when the transmission data allocation is populated by scheduled data, the transmission data allocation contains extra bits. These extra bits may be replaced with "padding" bits that do not contain data, but are instead included to fill up the transmission data allocation. Transmission of these padding bits is inefficient, utilizing network resources and device power without transmitting any relevant data. In circumstances where smaller transmission data allocations are allocated by the network (e.g. due to limited uplink resources due to uplink congestion), a correspondingly larger portion of the transmission data allocation may be associated with a non-scheduled data allowance. As such, if the non-scheduled grant is not fully utilized, the unused portions of the transmission data allocation may be assigned to padding bits to ensure that the data allocation is of the size expected by the network node. The smaller the transmission data allocation, the larger portion of the data allocation occupied by the non-scheduled grant, and therefore the larger ratio of the full transmission data allocation that is associated with unused padding bits, therefore resulting in decreased efficiency.

SUMMARY

Example embodiments include a method for controlling data transmission, the method comprising determining a transmission data allocation size for a plurality of transmission grants, the plurality of transmission grants defining a transmission allowance for a plurality of data types, each transmission grant being associated with one or more of the data types; populating a first portion of the transmission data allocation with data of a first data type associated with a first one of the plurality of transmission grants, populating a second portion of the transmission data allocation with data of a second data type associated with a second one of the plurality of transmission grants, determining that additional space remains in the first portion of the transmission data allocation; and populating the transmission data allocation with data of the second data type equal to a size of the additional space.

Example embodiments further include an apparatus comprising at least one processor and at least one memory including computer program code. The at least one memory and the computer program code are configured to, with the at least one processor, cause the apparatus at least to determine a transmission data allocation size for a plurality of transmission grants, the plurality of transmission grants defining a transmission allowance for a plurality of data types, each transmission grant being associated with one or more of the data types: populate a first portion of the transmission data allocation with data of a first data type associated with a first one of the plurality of transmission grants, populate a second portion of the transmission data allocation with data of a second data type associated with a second one of the plurality of transmission grants, determine that additional space remains in the first portion of the transmission data allocation, and populate the transmission data allocation with data of the second data type equal to a size of the additional space.

Example embodiments further comprise a non-transitory computer-readable storage medium comprising a set of instructions, which, when executed by a user equipment, causes the user equipment to perform the above-specified method.

BRIEF DESCRIPTION OF THE DRAWINGS

Figure 1:
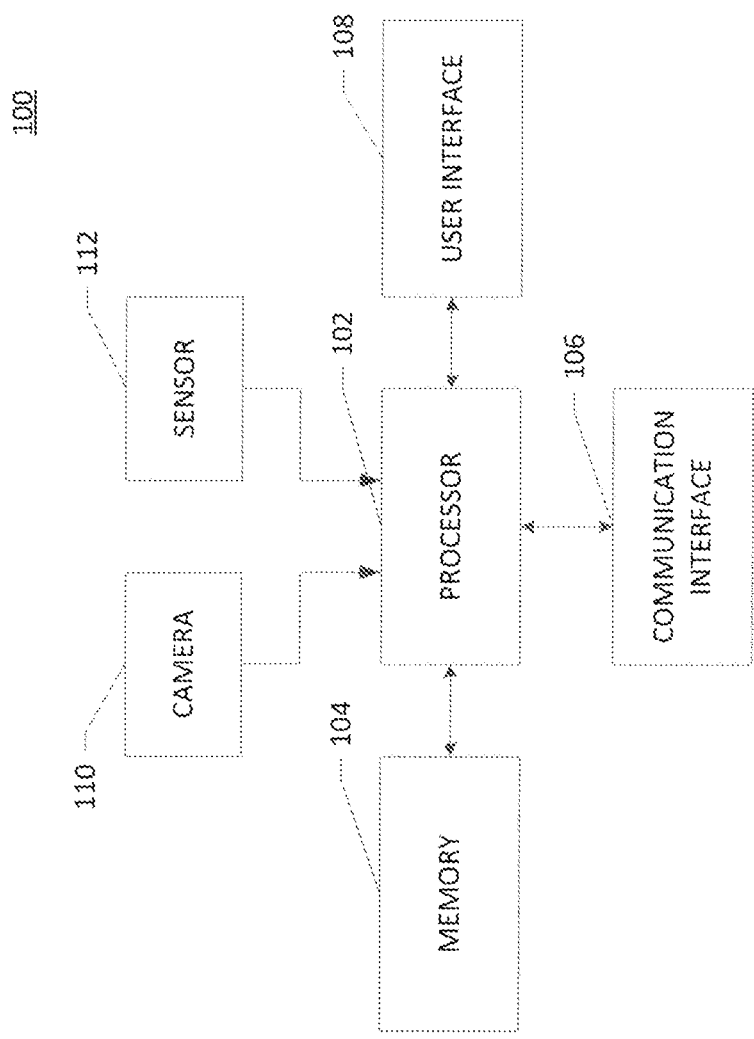
Figure 2:
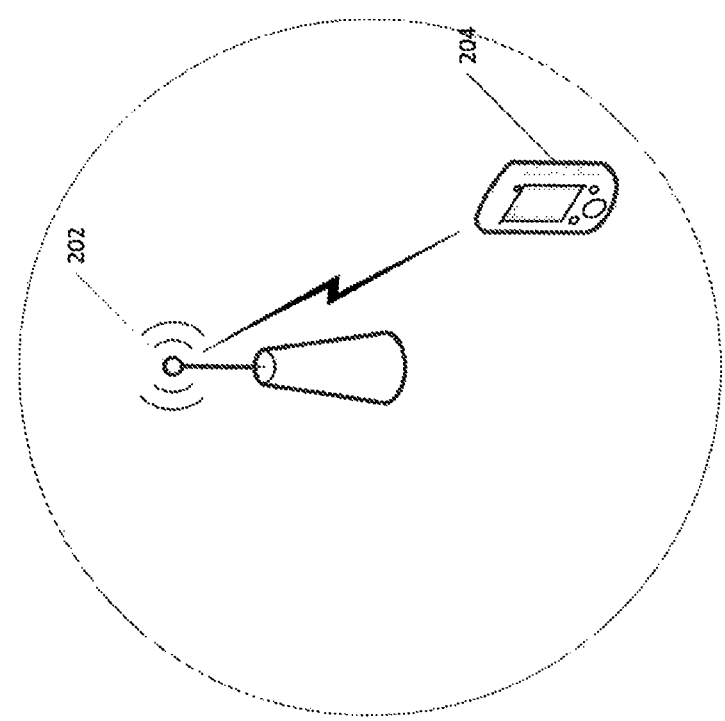
Figure 3:
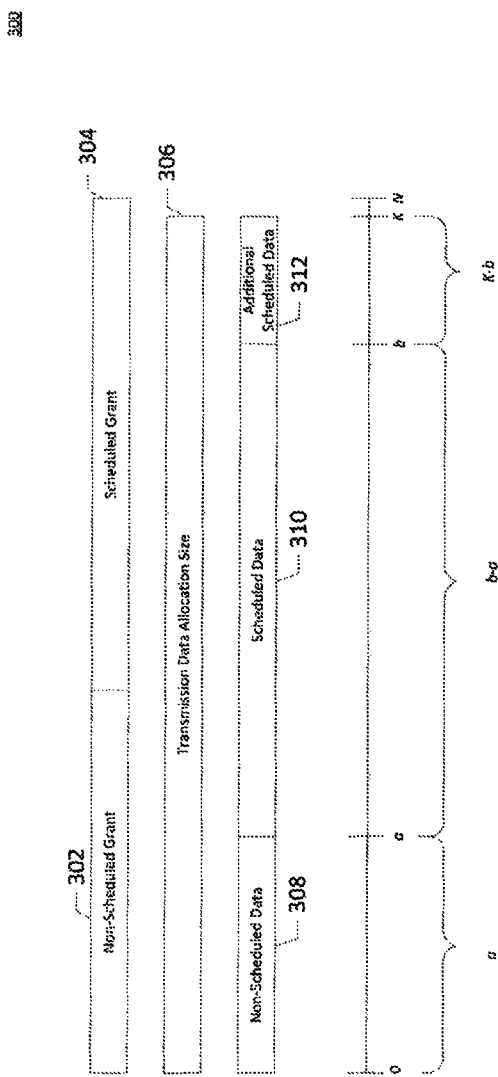
Figure 4:
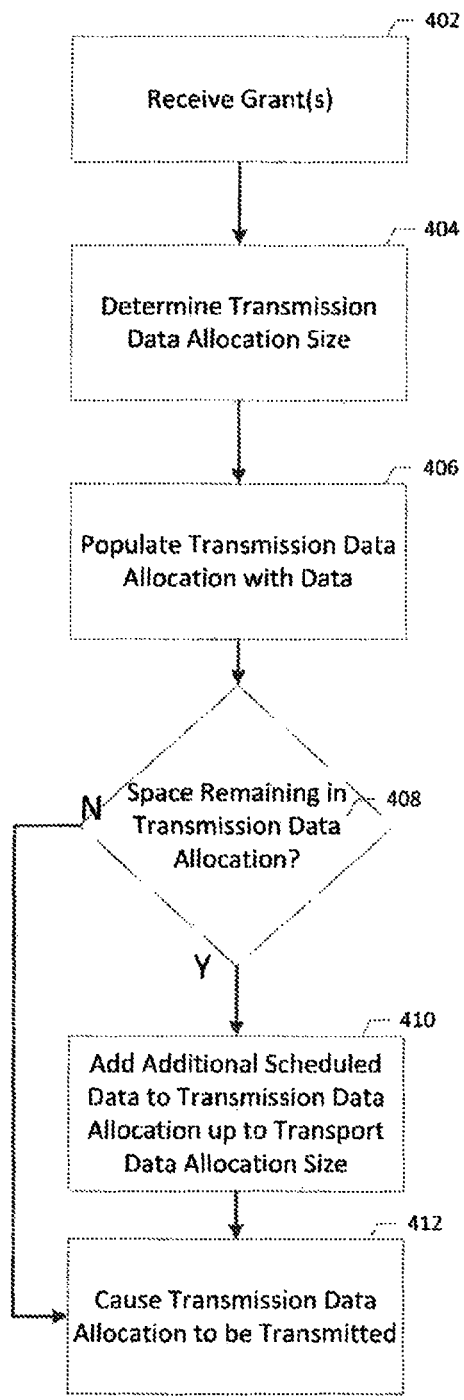

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment of the present invention;

FIG. 2 is a schematic diagram of an example mobile terminal in communication with a network node in accordance with an example embodiment of the present invention;

FIG. 3 is a block diagram of an example transmission data allocation in accordance with an example embodiment of the present invention; and FIG. 4 is a flow diagram of a method for managing data transmission in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein: rather, these embodiments are provided so that this disclosure will satisfy applicable legal requirements. Like reference numerals refer to like elements throughout. As used herein, the terms "data," "content," "information." and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and non-transitory computer-readable storage medium are provided in accordance with an example embodiment of the present invention in order to improve the efficiency of data transmissions. A method, apparatus and non-transitory computer-readable storage medium of an example embodiment may operate to enable communications between a UE and a network node.

A method, apparatus and non-transitory computer-readable storage medium are provided according to an example embodiment of the present invention in order to improve efficiency of data transmission operations. In this regard, the method, apparatus, and non-transitory computer-readable storage medium of an example embodiment may utilize a user equipment (UE), such as a mobile terminal, to communicate with a network node, such as a wireless station. The UE and network node may transmit to and receive data from one another via a wireless network. The UE and network node may negotiate allowed transmission data amounts to coordinate sending and receiving of data. The UE may receive grant information from the network node and determine a transmission data allocation size based on received grants. The UE may create a transmission data allocation based on the allowed transmission data size, and populate the transmission data allocation with scheduled data and non-scheduled data. If the non-scheduled data is not sufficient to fill the portion of the transmission data allocation allocated data allocation for the non-scheduled data, then the UE may add additional scheduled data to the transmission data allocation to fill the unused portions of the transmission data allocation. Current solutions ensure that the amount of scheduled data does exceed the amount allowed by the appropriate serving grant, while the amount of non-scheduled data does not exceed the amount allowed by the appropriate non-scheduled grant. If, for example, the actual amount of non-scheduled data included in the transmission is less than that allowed by the appropriate non-scheduled grant, then the transmission data allocation may contain unused padding bits.

The plurality of transmission grants may define a transmission allowance for a plurality of data types, and each transmission grant may be associated with one or more of the data types. The first data type may be non-scheduled data and the second data type may be scheduled data. The method may include causing the transmission data allocation to be transmitted to a network node. The transmission data allocation may be a Medium Access Control Protocol Data Unit. The method, apparatus and non-transitory computer-readable storage medium may also be configured to receive the plurality of transmission grants, determine the transmission data allocation size based on the aggregate size of the received transmission grants, and create the transmission data allocation corresponding to the transmission data allocation size. The transmission data allocation may be created according to a Universal Mobile Telecommunications System protocol or a Long Term Evolution protocol. In some embodiments, the apparatus is a user equipment. The user equipment may be a mobile telephone.

During communication between the UE and network node, a particular size may be selected for the transmission data allocation may be selected. The size of the selected transmission data allocation may be chosen so as to not exceed the total of the data amount allowed by the appropriate serving grant (e.g., a scheduled data grant) and the data amount allowed by the appropriate non-scheduled grant. Portions of the transmission data allocation may be filled with scheduled data, or unscheduled data, or both. The amount of scheduled data in the transmission data allocation may be allowed to exceed the amount allowed by the appropriate serving grant, providing that the total of the scheduled data plus non-scheduled data included in the transmission does not exceed the size of transmission data allocation which was selected earlier.

The system of an embodiment of the present invention may include an apparatus 100 as generally described below in conjunction with FIG. 1 for performing one or more of the operations set forth by FIGS. 2-4 and also described below. The apparatus will be described in terms of a UE or a network node for the purposes of example, but the apparatus 100 may also be embodied in another type of computing device, either mobile or fixed, such as a computer workstation, a personal computer, a laptop, a cellular phone, or a smart phone. In this embodiment, the apparatus 100 may be in communication with a display and/or a data network, either directly, such as via a wireless or wireline connection, or indirectly via one or more intermediate computing devices. The display and the apparatus 100 may be parts of the same system in some embodiments. However, the apparatus 100 may alternatively be embodied by another computing device that is in communication with the display and the mobile terminal, such as via a wireless connection, a wireline connection or the like. For example, the apparatus may be a mobile telephone, a personal digital assistant (PDA), a pager, a laptop computer, a tablet computer, a data card, a USB dongle, a cellular modem, a cellular base tower, an enhanced Node B (eNB), or any of numerous other hand held or portable communication devices, computation devices, content generation devices, content consumption devices or combinations thereof.

It should also be noted that while FIG. 1 illustrates one example of a configuration of an apparatus 100 for managing data transmissions, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 1, the apparatus 100 for transmitting data in accordance with example embodiments may include or otherwise be in communication with one or more of a processor 102, a memory 104, a communication interface 106, a user interface 108, a camera 110 and a sensor 112. In some embodiments, the processor (and/or co-processors or any other processing circuitry assisting or otherwise associated with the processor) may be in communication with the memory device via a bus for passing information among components of the apparatus. The memory device may include, for example, a non-transitory memory, such as one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

In some embodiments, the apparatus 100 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 102 may be configured to execute instructions stored in the memory device 104 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 106 may be any means such as a device or circuitry embodied in either hardware or a combination of hardware and software that is configured to receive and/or transmit data from/to a network and/or any other device or module in communication with the apparatus 100, such as by supporting communications with a display and/or a mobile terminal. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms. The communication interface 106 may serve to couple the apparatus 100 to a cellular network, such as a network operating according to a Universal Mobile Telecommunication System (UMTS). Long Term Evolution, or Long Term Evolution-Advanced protocol.

The apparatus 100 may include a user interface 108 that may, in turn, be in communication with the processor 102 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. In one embodiment, the display of the apparatus may be embodied by a liquid crystal display (LCD) screen presented on one surface of the mobile terminal. The processor 102 may comprise user interface circuitry configured to control at least some functions of one or more user interface elements such as a display and, in some embodiments, a speaker, ringer, microphone and/or the like. The processor 102 and/or user interface circuitry comprising the processor 102 may be configured to control one or more functions of one or more user interface elements through computer program instructions (e.g., software and/or firmware) stored on a memory accessible to the processor (e.g., memory 104, and/or the like).

In some example embodiments, the apparatus 100 may include an image capturing element, such as a camera 110, video and/or audio module, in communication with the processor 102. The image capturing element may be any means for capturing an image, video and/or audio for storage, display or transmission. For example, in an example embodiment in which the image capturing element is a camera, the camera may include a digital camera capable of forming a digital image file from a captured image. As such, the camera may include all hardware (for example, a lens or other optical component(s), image sensor, image signal processor, and/or the like) and software necessary for creating a digital image file from a captured image. Alternatively, the camera may include only the hardware needed to view an image, while a memory device 104 of the apparatus stores instructions for execution by the processor in the form of software necessary to create a digital image file from a captured image. In an example embodiment, the camera 110 may further include a processing element such as a co-processor which assists the processor in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

As shown in FIG. 1, the apparatus 100 may also include one or more sensors 112, such as a location information receiver (e.g., a GPS receiver), an accelerometer, a gyroscope, a compass, or the like, that may be in communication with the processor 102 and may be configured to determine the location of the apparatus and to detect changes in motion and/or orientation of the apparatus.

The method, apparatus 100 and computer program product may now be described in conjunction with the operations illustrated in FIGS. 2-4. In this regard, the apparatus may include means, such as the processor 102, the communications interface 106, or the like, for transmitting data. The apparatus 100 may function as a UE in communication with a network node. The apparatus 100 may determine a transmission data allocation size in communication with the network node, such as by receiving one or more transmission data grants from the network node (e.g., a grant to transmit a certain number of bits of data at a certain time). The apparatus 100 may establish a transmission data allocation in accordance with the transmission data allocation size, and populate the transmission data allocation with non-scheduled data and scheduled data, based on the transmission data grants. If the transmission data allocation has remaining space after being populated with the non-scheduled data and the scheduled data, then the apparatus 100 may include additional scheduled data to fill the transmission data allocation. In some embodiments, the processor 102 functions as a processing means to determine the transmission data allocation size, populate the transmission data allocation with the scheduled data and the non-scheduled data, and to cause transmission of the transmission data allocation.

FIG. 2 is a schematic diagram of an example mobile terminal in communication with a wireless station in accordance with an example embodiment of the present invention. FIG. 2 depicts a wireless network 200 including a network node 202 in communication with a UE 204. The wireless network 200 may represent a single "cell" of a cellular network operated by a cellular provider. The network node 202 may be a tower or set of towers fir providing coverage to the cell of the network. The wireless network 200 may be provided according to one or more wireless protocols, such as UMTS or Long Term Evolution. Examples of network nodes may include, but are not limited to, UMTS "Node B" or "Radio Network Controller" nodes, or Long Term Evolution "Enhanced Node B" (eNodeB) nodes. As described above, the UE 204 may be any type of mobile terminal, laptop, desktop, cellular modem, data card, USB dongle, or computing device capable of wireless communication with the network node 202.

The UE 204 and the network node 202 may communicate data over various frequencies of the spectrum. Communications may be enabled between these devices according to various scheduling methods, such as time division multiple access (TDMA) or code division multiple access (CDMA). These communications may include scheduled and non-scheduled data transmissions. The network node 202 may provide transmission data grants to the UE 204 for transmission of this data. For example, the network node may specify a particular non-scheduled data grant when communication is established, and determine a scheduled data grant dynamically based on network conditions. Since the non-scheduled grant is static, the size of the non-scheduled grant may exceed the amount of non-scheduled data available for transmission by the UE 204. Embodiments of the invention allow for extra scheduled data to be transmitted within the transmission data allocation in the event space remains in the transmission data allocation after allocation of available non-scheduled data. Example methods illustrating the generation of such a transmission data allocation are described further below with respect to FIGS. 3 and 4.

FIG. 3 is a block diagram of an example transmission data allocation 300 in accordance with an example embodiment of the present invention. The transmission data allocation 300 is depicted with respect to a transmission allowance of size N bits, which is constructed from one or more data transmission grants. The transmission data allocation 300 may be a transmission block, such as a Radio Link Control Protocol Data Unit (RLC PDU) encoded in a Medium Access Control-D type Protocol Data Unit (MAC-D PDU) format. Additionally or alternatively, the transmission data allocation 300 may be included in other data transmission formats, where the transmission data allocation 300 is a segment of a PDU or one of a plurality of PDUs included in a single transmission structure (e.g., a MAC-ES format). Note that although transmission allowance and grant sizes are described with respect to a particular number of bits, these windows may also correspond to a particular time (e.g., 10 ms, 20 ms, or the like), rather than a specific number of bits. In the present example, a UE has received a non-scheduled grant 302 (e.g., a non-scheduled grant determined during establishment of a radio bearer associated with the connection to the network node) and a scheduled grant 304 for transmission of data (e.g., a dynamically determined serving grant). These grants may be aggregated to determine a maximum transmission allowance of size N bits. For example, the UE may receive (or independently determine) a non-scheduled grant 302 of 168 bits, and a scheduled grant 304 of 256 bits, resulting in a total transmission allowance of 424 bits.

The UE may create a transmission data allocation 306 based on the total transmission allowance. For example, the transmission data allocation may be a MAC Protocol Data Unit (MAC PDU) as specified in the 3GPP 25.321 standard. The creation of the transmission data allocation 306 may include the UE selecting a maximum transmission data allocation size that will fit in the transmission allowance, in order to allow the UE to transmit as much data as possible during the granted period. The transmission block size may be slightly less than the total grant window to ensure that the transmission block 306 transmits entirely during the allowance or the transmission block size 306 may be equal to the total transmission allowance. Although data size is provided as an example of one method for choosing a data allocation size, other factors, such as the availability of network resources or available transmission power, may also be used to select the size of the transmission data allocation. In the present example, a transmission data allocation 306 of size k has been allocated for transmission of data, where k<n. For example, if the total transmission allowance is 424 bits as described above, a transmission data allocation 306 of size 382 bits may be used to transmit data during the transmission allowance.

Once the transmission data allocation size has been determined, the transmission data allocation 306 is filled with data. The data may include non-scheduled data 308 and scheduled data 310, up to the size of the non-scheduled grant 302 and the scheduled grant 304, respectively. The transmission data allocation 306 may first be filled with non-scheduled data 308 up to the size of the maximum non-scheduled grant 302. The transmission data allocation 306 may then be populated with scheduled data 310. In the present example, the transmission data allocation 306 has been populated with non-scheduled data of size a, and scheduled data of size b-a. Notably, the size of the non-scheduled data a is less than the non-scheduled grant 302. As such, if the transmission data allocation is filled with only the non-scheduled data 308 and the scheduled data 310, then the transmission data allocation will have unfilled space due to the non-scheduled grant 302 being larger than the non-scheduled data available for transmission.

Rather than transmit blank or so-called "padding" data to fill up the transmission data allocation 306, additional scheduled data 312 may be included for transmission. In the present example, with a transmission data allocation of size k, the additional scheduled data may include up to k−b extra bits that may represent up to the portion of the transmission data allocation not used by the non-scheduled data but granted by the non-scheduled grant 302. This allows for extra transmission of scheduled data over and beyond that which would be allowed if the extra data in the transmission data allocation remained reserved for non-scheduled data. To continue the example above, if the transmission data allocation is of size 382 bits, then if the UE only has a total of 200 bits (non-scheduled data plus the original scheduled grant) to transmit, then up to 182 bits would otherwise be wasted. Allowing transmission of scheduled data during the additional 182 bit transmission period allows for more efficient transmission of actual data rather than padding bits that merely serve to ensure proper size and bit alignment of the transmission data allocation.

FIG. 4 is a flow diagram of a method 400 for managing data transmission in accordance with an example embodiment of the present invention. The method 400 allows for transmission of additional scheduled data in circumstances where a transmitting device does not fully utilize a transmission grant associated with scheduled data. The additional scheduled data may be appended to a given transmission data allocation to maximize data transmission capabilities of the transmitting device, and to avoid transmission of extra "padding" data. The method 400 may be performed by a processing means, such as the processor 102 described above with respect to FIG. 1.

At action 402, one or more grants are received. These grants may include scheduled and non-scheduled data transmission grants received from a network node, or one or more of the grants may be determined directly by the UE. These grants may refer to a particular number of bits or a particular time window as described above with respect to FIG. 2. As described above, these grants may be received at different times. For example, a non-scheduled grant may be established for the connection during initiation of the connection, such as when a radio bearer associated with the connection is established. The scheduled grant (e.g., a serving grant) may be dynamically determined based on network conditions and the availability of network resources. In some embodiments, the scheduled grant may be a serving grant as determined based on an absolute grant received on an Absolute Grant Channel (AGCH) and/or a relative grant received on a Relative Grant Channel (RGCH). The grants may be received by a processing means, such as the processor 102.

At action 404, a transmission data allocation size is determined. The transmission data allocation size may be determined based on the received grants. For example, a maximum transmission data allocation size that fits within the total granted time or size allowance may be selected as the transmission data allocation size. The transmission data allocation size may be determined by a processing means, such as the processor 102.

At action 406, a transmission data allocation of the size determined at action 404 is populated with data. As described above with respect to FIGS. 1-3, the transmission data allocation may be populated with non-scheduled data and scheduled data. The transmission data allocation may be populated by non-scheduled data up to the size of a non-scheduled grant as received at action 402. The transmission data allocation may further be populated with scheduled data up to the size of a scheduled grant as received at action 402. When the transmission data allocation has been populated with the lesser of available non-scheduled data and non-scheduled data equal to the non-scheduled grant size, and scheduled data up to the scheduled grant size, the method proceeds to action 408. The transmission data allocation may be populated with data by a processing means, such as the processor 102.

At action 408, a determination is made as to whether space remains in the transmission data allocation after population at action 406. If the transmission data allocation is full, then the method proceeds to action 412 for transmission of the transmission data allocation. If the transmission data allocation has remaining space (e.g., the amount of non-scheduled data for transmission was less than the size of the non-scheduled grant), then the method proceeds to action 410. The determination as to whether space remains in the transmission data allocation may be performed by a processing means, such as the processor 102.

At action 410, if the non-scheduled data available for transmission does not use up the entire non-scheduled grant, then additional scheduled data may be added to the transmission data allocation to fill the unutilized space remaining in the transmission data allocation, equal to the size of the unused portion of the non-scheduled grant. The scheduled grant may be dynamically determined such that the amount of scheduled data is at least as large as the scheduled grant, with the possibility of receiving a smaller scheduled grant than the amount of data available for transmission, such as in highly congested networks. In this manner, space that would otherwise be unused (e.g., mere "padding" data appended to ensure the transmission data allocation is the expected size), is used to transmit data that might otherwise have to be transmitted in the next transmission data allocation, thus improving efficiency of the data transmission by requiring fewer overall bits of data. The additional scheduled data may be added to the transmission data allocation by a processing means, such as the processor 102.

At action 412, the transmission data allocation is caused to be transmitted. For example, the transmission data allocation may be transmitted from a UE to a network node as part of an uplink operation. By ensuring that the transmission data allocation contains as much data as possible, the overall number of transmission operations may be lowered, thus resulting in increased efficiency in the use of network resources and device power. The transmission data allocation may be caused to be transmitted by a processing means, such as the processor 102.

It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations fir implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions. In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for controlling data transmission, the method comprising:
    determining, with circuitry, a transmission data allocation size for a plurality of transmission grants, the plurality of transmission grants defining a transmission allowance for a plurality of data types, each transmission grant being associated with one or more of the data types;
    populating, with the circuitry, a first portion of the transmission data allocation associated with a first one of the plurality of transmission grants with data of a first data type associated with the first one of the plurality of transmission grants;
    populating, with the circuitry, a second portion of the transmission data allocation associated with a second one of the plurality of transmission grants with data of a second data type associated with the second one of the plurality of transmission grants;
    determining, with the circuitry, that additional space remains in the first portion of the transmission data allocation; and
    populating, with the circuitry, the first portion of the transmission data allocation with data of the second data type equal to a size of the additional space.

2. The method of claim 1, wherein the first data type is non-scheduled data and the second data type is scheduled data.

3. The method of claim 1, further comprising causing the transmission data allocation to be transmitted to a network node.

4. The method of claim 1, wherein the transmission data allocation is a Medium Access Control Protocol Data Unit.

5. The method of claim 1, further comprising:
    receiving the plurality of transmission grants;
    determining the transmission data allocation size based on an aggregate size of the received transmission grants; and
    creating the transmission data allocation corresponding to the transmission data allocation size.

6. The method of claim 1, wherein the transmission data allocation is created according to a Universal Mobile Telecommunications System protocol or a Long Term Evolution protocol.

7. An apparatus for controlling data transmission, the apparatus comprising:
at least one processor; and
at least one memory including computer-readable instructions that when executed by the at least one processor cause the at least one processor to:
determine a transmission data allocation size for a plurality of transmission grants, the plurality of transmission grants defining a transmission allowance for a plurality of data types, each transmission grant being associated with one or more of the data types;
populate a first portion of the transmission data allocation associated with a first one of the plurality of transmission grants with data of a first data type associated with the first one of the plurality of transmission grants;
populate a second portion of the transmission data allocation associated with a second one of the plurality of transmission grants with data of a second data type associated with the second one of the plurality of transmission grants;
determine that additional space remains in the first portion of the transmission data allocation; and
populate the first portion of the transmission data allocation with data of the second data type equal to a size of the additional space.

8. The apparatus of claim 7, wherein the first data type is non-scheduled data and the second data type is scheduled data.

9. The apparatus of claim 7, wherein the at least one memory and the computer-readable instructions further cause the at least one processor to cause the transmission data allocation to be transmitted to a network node.

10. The apparatus of claim 7, wherein the transmission data allocation is a Medium Access Control Protocol Data Unit.

11. The apparatus of claim 7, wherein the computer-readable instructions further cause the at least one processor to
receive the plurality of transmission grants;
determine the transmission data allocation size based on the aggregate size of the received transmission grants; and
create the transmission data allocation corresponding to the transmission data allocation size.

12. The apparatus of claim 7, wherein the computer-readable instructions further cause the at least one processor to communicate according to a Universal Mobile Telecommunications System protocol or a Long Term Evolution protocol.

13. The apparatus of claim 7, wherein the apparatus is a user equipment.

14. The apparatus of claim 13, wherein the user equipment is a mobile telephone.

15. A non-transitory computer-readable storage medium comprising a set of computer-readable instructions stored thereon, which, when executed by a processor cause the processor to perform a method comprising:
populating a first portion of a transmission data allocation associated with a first one of a plurality of transmission grants with data of a first data type associated with the first one of the plurality of transmission grants, the plurality of transmission grants defining a transmission window for a plurality of data types, each transmission grant being associated with one or more of the data types;
populating a second portion of the transmission data allocation associated with a second one of the plurality of transmission grants with data of a second data type associated with the second one of the plurality of transmission grants;
determining that additional space remains in the first portion of the transmission data allocation; and
populating the first portion of transmission data allocation with data of the second data type equal to a size of the additional space.

16. The non-transitory computer-readable storage medium of claim 15, wherein the first data type is non-scheduled data and the second data type is scheduled data.

17. The non-transitory computer-readable storage medium of claim 15, further comprising causing the transmission data allocation to be transmitted to a network node.

18. The non-transitory computer-readable storage medium of claim 15, wherein the transmission data allocation is a Medium Access Control Protocol Data Unit.

19. The non-transitory computer-readable storage medium of claim 15, further comprising:
receiving the plurality of transmission grants; determine the transmission data allocation size based on the aggregate size of the received transmission grants; and
creating the transmission data allocation corresponding to the transmission data allocation size.

20. The non-transitory computer-readable storage medium of claim 15, wherein the transmission data allocation is created according to a Universal Mobile Telecommunications System protocol or a Long Term Evolution protocol.

* * * * *